(12) United States Patent
Facon

(10) Patent No.: US 10,754,889 B2
(45) Date of Patent: Aug. 25, 2020

(54) COMPUTER SYSTEM AND METHOD FOR DYNAMICALLY GENERATING AN IMAGE FROM DIGITAL CONTENT ITEMS

(71) Applicant: Quotient Technology Inc., Mountain View, CA (US)

(72) Inventor: Xavier Facon, New York, NY (US)

(73) Assignee: QUOTIENT TECHNOLOGY INC., Mountain View, CA (US)

(*) Notice: Subject to any disclaimer, the term of this patent is extended or adjusted under 35 U.S.C. 154(b) by 169 days.

(21) Appl. No.: 15/989,085

(22) Filed: May 24, 2018

(65) Prior Publication Data

US 2019/0361995 A1    Nov. 28, 2019

(51) Int. Cl.
G06F 16/00        (2019.01)
G06F 16/58        (2019.01)
G06F 16/51        (2019.01)
G06F 16/248       (2019.01)

(52) U.S. Cl.
CPC ........ G06F 16/5866 (2019.01); G06F 16/248 (2019.01); G06F 16/51 (2019.01)

(58) Field of Classification Search
None
See application file for complete search history.

(56) References Cited

U.S. PATENT DOCUMENTS 9,131,339 B1 *   9/2015  Kulfan .................... H04L 67/18
9,654,840 B1     5/2017  Price
2013/0139271 A1* 5/2013  Arrelid ..................... G06F 21/62
                                                         726/27
2016/0071151 A1  3/2016  Kramer et al.
2016/0224404 A1* 8/2016  Mehta ................. G06F 11/0793
2016/0360245 A1  12/2016 Sanghavi et al.
2016/0379279 A1  12/2016 Ashery et al.
2017/0242875 A1* 8/2017  Jiang ..................... G06F 16/353
2018/0225725 A1* 8/2018  Paul ...................... H04N 21/458

OTHER PUBLICATIONS

International Searching Authority, "Search Report" in application No. PCT/US 19/33812, dated Aug. 19, 2019, 25 pages.
Current Claims in application No. PCT/US 19/33812, dated Aug. 2019, 8 pages.

* cited by examiner

*Primary Examiner* — Bai D Vu
(74) *Attorney, Agent, or Firm* — Elliot H. Karlin; Hickman Palermo Becker Bingham LLP

(57) ABSTRACT

Systems and methods for dynamically generating a digital image are described herein. In an embodiment, a server computer stores a first plurality of digital content items of an image requesting entity, a second plurality of digital content items comprising call to action identifiers, and a third plurality of content items of a different provider entity of a plurality of provider entities. The server computer further stores client computing device history data and provider entity data. The server computer identifies a first particular digital content item of the first plurality of digital content items, a second particular digital content item of the second plurality of content items, and a third particular digital content item of the third plurality of content items based, at least in part, on subsets of the client computing device history data and/or the provider entity data. The server computer generates a digital image comprising the particular digital content items.

16 Claims, 5 Drawing Sheets

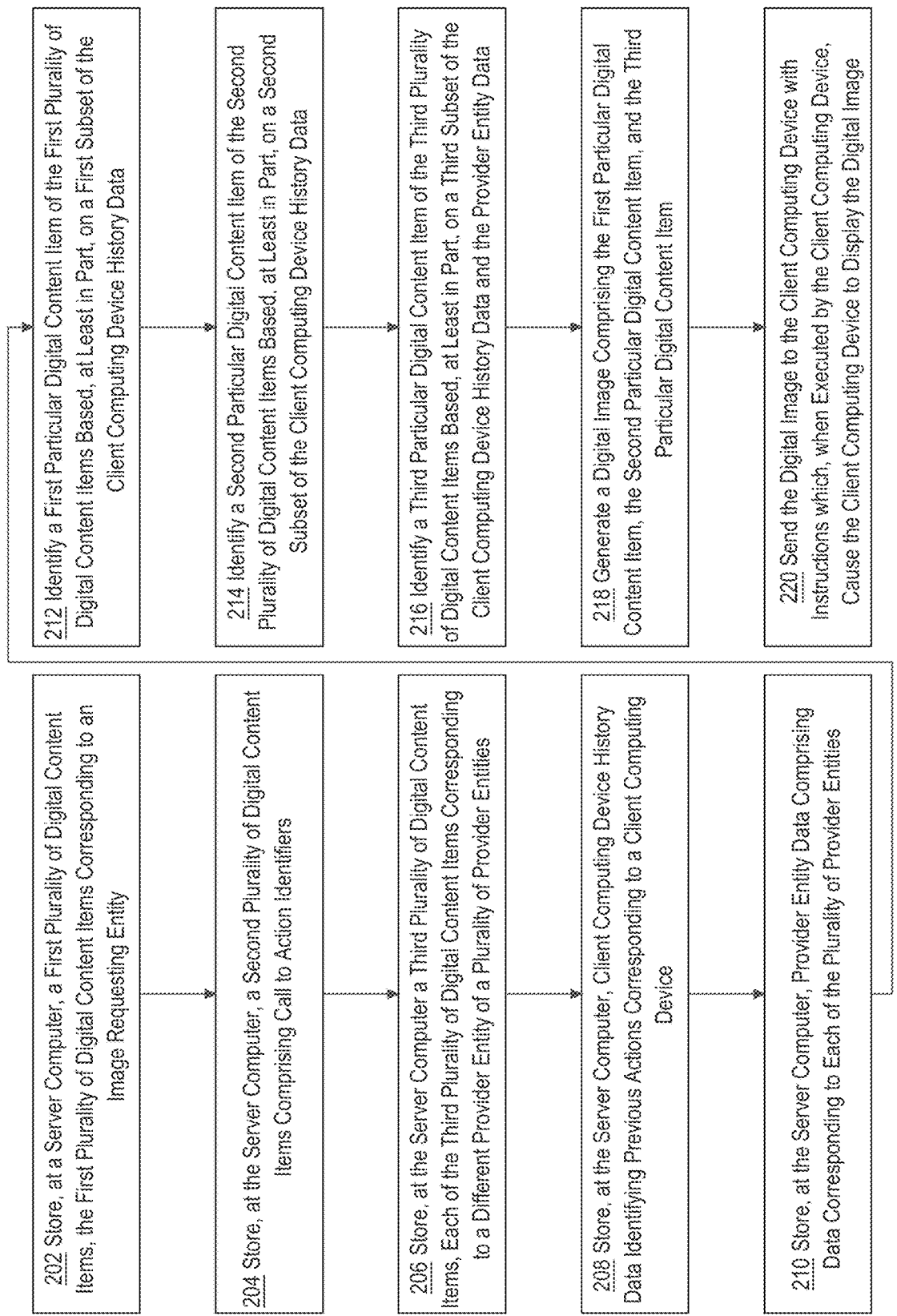

COMPUTER SYSTEM AND METHOD FOR DYNAMICALLY GENERATING AN IMAGE FROM DIGITAL CONTENT ITEMS

FIELD OF THE DISCLOSURE

The present disclosure generally relates to the technical field of customized digital image generation for computing devices. The disclosure relates more specifically to dynamically generating customized digital image from content items selected based on programmatic algorithms and tracked computing device data at the time of serving the digital image.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Using the internet, many websites and online applications provide content from outside sources. Content items can range from text to images to videos which often provide additional information to the website. For instance, websites may display images representing articles from different websites, banner advertisements, gameplay statistics from one or more online games, and/or other digital content elements obtained from outside the website.

While there is often a requester for the digital images, such as a manufacturer of a consumer-packaged good (CPG), there may be other information that is relevant to the user of the client computing device that is not part of the requested image. For instance, while the manufacturer of the CPGs may want to display a banner advertisement for one or more of their products, the banner advertisement may be more effective if it can include identification of locations to purchase the CPGs and or offers to reduce the price of the CPGs.

While different content items may be relevant to a user of a client computing device, the digital image tends to be static as it is displayed when the user accesses the website. Often the use of a single static image is based on the requirements of the websites which may only have a single location available for a single image.

Additionally, while the requester of the image may have an interest in an image that includes information from other sources that is relevant to the client computing device, generating an image for each possible combination of elements becomes cost prohibitive, especially as the number of elements rises. For instance, if the image requester wishes for images with a first element of two options based on the imager requester content and a second element of two options based on outside content, the image requester would need to generate four different images. As the number of elements and number of options for each element rises, the number of images rises exponentially, with twenty-seven images needed for three elements with three options for each.

The difficulty in incorporating elements from different locations further makes it difficult to customize an image to a client computing device. With singular static images, the level of granularity that is possible is limited by the number of images that are generated. Thus, an image generator is unable to factor in different types of preferences, location data, and data from outside content providers to personalize the images without pre-generated images for each possible combination.

Based on the foregoing, there is a need for a system that dynamically generates images for display based on information from the client computing device which includes digital content items received from a plurality of sources.

SUMMARY

The appended claims may serve as a summary of the disclosure.

BRIEF DESCRIPTION OF THE DRAWINGS

In the drawings:

FIG. 2 is a flow diagram that illustrates an example method for generating a dynamic image.

DETAILED DESCRIPTION

Figure 1A:
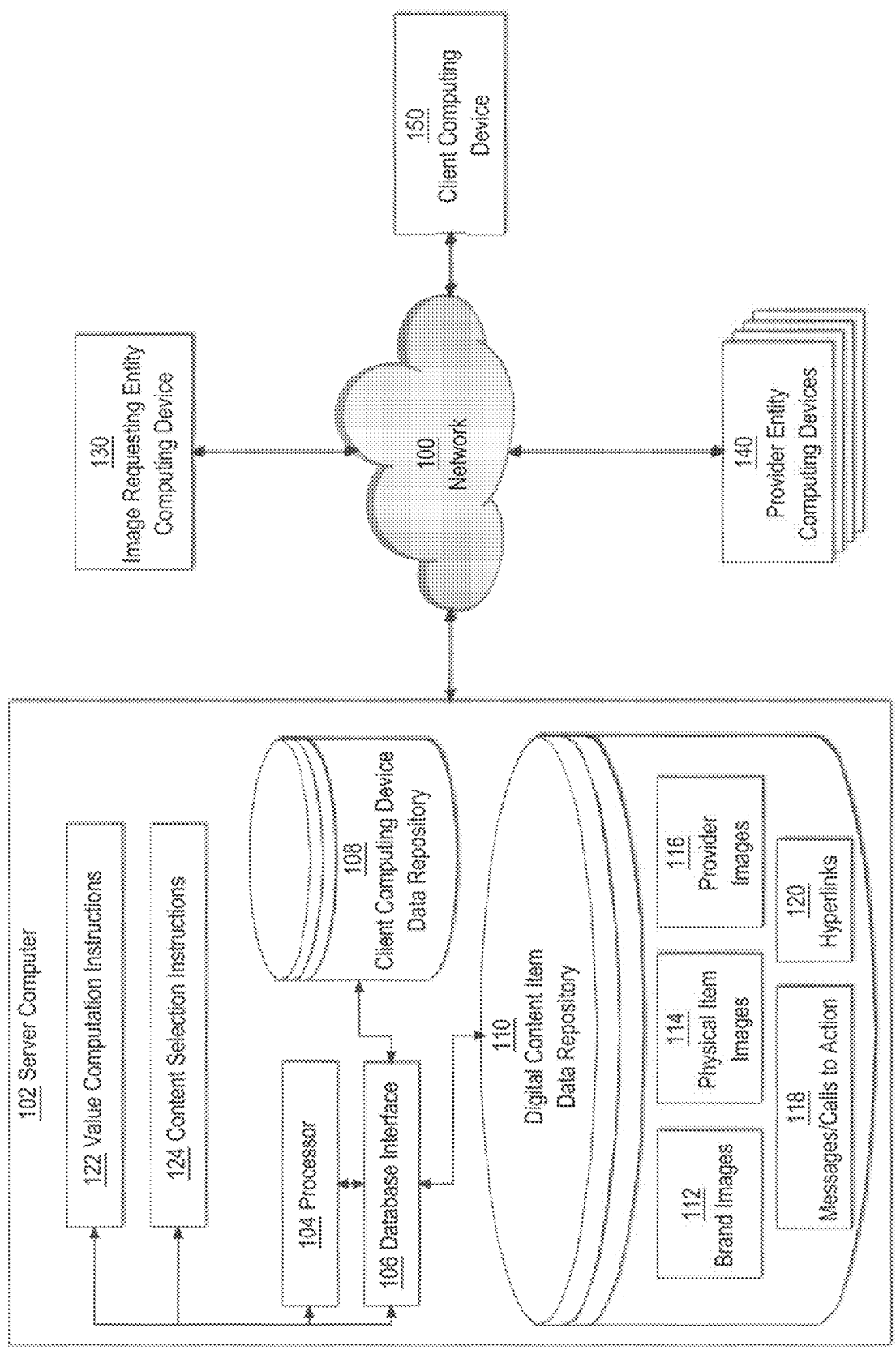
FIG. 1A illustrates an example computer system with which embodiments may be implemented.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form to avoid unnecessarily obscuring the present disclosure.

Embodiments are described in sections according to the following outline:

1.0 GENERAL OVERVIEW
2.0 EXAMPLE NETWORKED COMPUTER SYSTEM
3.0 STORED CLIENT DATA
4.0 DYNAMIC IMAGE GENERATION
5.0 ALGORITHMS AND VALUES
6.0 ADDITIONAL EMBODIMENTS
7.0 BENEFITS OF CERTAIN EMBODIMENTS
8.0 HARDWARE OVERVIEW

1.0 GENERAL OVERVIEW

Systems and methods for dynamically generating digital images are described herein. In an embodiment, a server computer stores digital content items from a plurality of sources, including digital content items of an image requesting entity, digital content items of call to action identifiers, and digital content items of a plurality of provider entities. The server computer additionally stores client computing device history data and provider entity data. When the server computer receives a request for a digital image to be provided, the server computer uses the client computing device history data to select a first digital content item of a particular image requesting entity and a second digital content item of a particular call to action identifier. The server computer additionally selects a third digital content item of a particular provider entity of the plurality of provider entities based on the client computing device history data and the provider entity data. Using the identified digital content items, the server computer generates a digital image and causes the digital image to be displayed on the client computing device.

In an embodiment, a computer-implemented method comprises storing, at a server computer, a first plurality of digital content items, the first plurality of digital content items of an image requesting entity; storing, at the server computer, a second plurality of digital content items comprising call to action identifiers; storing, at the server computer, a third plurality of content items, each of the third plurality of digital content items of a different provider entity of a plurality of provider entities; storing, at the server computer, client computing device history data identifying previous actions of a client computing device; storing, at the server computer, provider entity data comprising data of each of the plurality of provider entities; identifying a first particular digital content item of the first plurality of digital content items based, at least in part, on a first subset of the client computing device history data; identifying a second particular digital content item of the second plurality of content items based, at least in part, on a second subset of the client computing device history data; identifying a third particular digital content item of the third plurality of content items based, at least in part, on a third subset of the client computing device history data and the provider entity data; generating a digital image comprising the first particular digital content item, the second particular digital content item, and the third particular digital content item; causing displaying the digital image on the client computing device.

2.0 EXAMPLE NETWORKED COMPUTER SYSTEM

FIG. 1 illustrates an example computer system that may be used to implement an embodiment.

In an embodiment, a server computer ("server" for short) 102 is communicatively coupled to an image requesting entity computing device 130, a provider entity computing device 140, and a client computing device 150 directly or indirectly via network 100. Network 100 comprises one or more data networks including any of local area networks, wide area networks, internetworks or internets.

In one embodiment, a server computer 102 comprises a processor 104, value computation instructions 122, content selection instructions 124, and database interface 106. Processor 104 broadly represents one or more hardware processors such as central processing units, processor cores, or processor modules, with associated support circuitry such as memory management circuits, I/O circuits, display drivers, and the like. Each of value computation instructions 122, content selection instructions 124, and database interface 106 represent regions in main memory, such as RAM, coupled to and accessible by the processor 104, and programmed with machine executable instructions that are configured to perform the functions described herein when executed using the processor.

Although the value computation instructions 122 and content selection instructions 124 are shown in FIG. 1 as executing on the server computer 102, the value computation instructions 122 and content selection instructions 124 may be a part of computer instructions installed as part of a separate system, as a module or a plug-in to supplement features of the server, as a separate instance of executing code on the server computer 102, or any other arrangement depending on the needs of a client device The database interface 106 is coupled to a client computing device data repository 108 and a digital content item data repository 110. In this context, "database" may refer to a relational database, flat file, table, spreadsheet, or any other form of collective data storage that is capable of programmatic interrogation, such as using a query or API call, to obtain a result set of one or more records or datasets.

In one embodiment, client computing device data repository 108 stores records relating to a plurality of client computing devices, and is further discussed with reference to FIG. 1B.

In an embodiment, digital content item data repository 110 stores digital content items to be used to generate digital images. The digital content items may include media, such as images or video, text inputs, such as flat text files or text strings, and/or hyperlinks to one or more websites. Digital content item data repository 110 may additionally store data describing the digital content items. For example, digital content item data repository 110 may store data defining a product in an image and describing one or more characteristics for the product. Additionally or alternatively, digital content item data repository 110 may store data identifying one or more categories for a digital content item. For example, the digital content item data repository may store data identifying a first message as a "value" message and a second message as a "convenience" message.

In FIG. 1, digital content item data repository 110 comprises brand images 112, physical item images 114, provider images 116, messages/calls to action 118, and hyperlinks 120. Brand images 112 comprise images of different brand identifiers for a product, such as brand logos. Physical item images 114 comprise images used to advertise a physical product, such as images of the product itself or images demonstrating use/need for the product. For example, a physical item image promoting milk may include an image of the milk and/or an image of chocolate cake with a tagline indicating a need for milk. Provider images 116 comprise one or more images for each of the provider entity computing devices 140, such as provider logos. Messages/calls to action 118 may include messages and/or images that identify an action to be performed by a user of the client computing device 150. For example, a message may invite a user to select a displayed image in order to obtain a coupon for a transaction. As another example, a message may accentuate a selling feature of a product. Hyperlinks 120 comprise one or more hyperlinks for redirecting the client computing device upon selection of a generated digital image. For example, a hyperlink may cause the client computing device to navigate to a website where a coupon can be obtained for the product.

Although the client computing device data repository 108 and the digital content item data repository 110 are shown in FIG. 1 as encompassed by the server, the client computing device data repository 108 and the digital content item data repository 110 may exist separately from the server computer 102, and accordingly accessed via network 128.

In an embodiment, server computer 102 executes value computation instructions 122 and content selection instructions 124. Value computation instructions 122 comprise computer readable instructions which, when executed by the one or more processors 104, cause the server computer to compute one or more values for a client computing device based, at least in part, on client computing device data stored in the client computing device data repository 108. Content selection instructions 124 comprise computer readable instructions which, when executed by the one or more processors 104, cause the server computer to select digital content items from digital content item data repository 110 for dynamically generating a digital image.

Client device 150 broadly represents any computing device that is separate from the server computer 102, such as a laptop computer, desktop computer, tablet computer, smartphone, workstation, or other computer that is configured to communicate with server computer 102 over network 100. Client computing device 150 may send data regarding the client computing device to server computer 102 over network 100. Additionally or alternatively, data from client computing device 150 may be collected by one or more external data sources and provided to server computer 102 over network 100.

Image requesting entity computing device 130 represents any computing device that is separate from the server computer 102, such as a laptop computer, desktop computer, tablet computer, smartphone, workstation, or other computer, and that is associated with a request for images to be displayed on a client computing device, such as through a website and/or image banner. Image requesting entity computing device 130 sends digital content items to server computer 102 over network 100. For example, image requesting entity computing device 130 may send brand images 112 and physical item images 114 to server computer 102 over network 100 for the purpose of generating digital images, such as advertisement banners. Image requesting entity computing device 130 may additionally send additional data describing the brand images 112 and/or physical item images 114. For example, an image of a bag of cat food may be accompanied with a description of the cat food, such as the weight, ingredients, nutritional facts, and any other data relating to the cat food. The descriptions may include general information categories, such as weight and price, as well as item specific categories of information. For example, laundry detergent images may be accompanied by data stating whether the detergent is scented or unscented. On the other hand, potato chip bag images may be accompanied by data identifying the flavor of potato chips.

Provider entity computing devices 140 represent computing devices that are separate from the server computer 102, such as a laptop computer, desktop computer, tablet computer, smartphone, workstation, or other computer, and that are each associated with a different provider of physical items. For example, provider entity computing devices 140 may be associated with competing grocery stores, pharmacies, clothing stores, and/or other providers of physical goods. In an embodiment, provider entity computing devices 140 send supplier entity data to server computer 102 over network 100. Supplier entity data may comprise provider images 116 which identify the provider entity and/or additional data regarding the provider, such as store locations, store hours, catalogs of items sold at the store locations, prices for the items, offers or coupons, customer data, and/or other data regarding the provider entities.

Network 100 may be implemented by any medium or mechanism that provides for the exchange of data between the various elements of FIG. 1. Examples of network 100 include, without limitation, a cellular network, communicatively coupled with a data connection to the computing devices over a cellular antenna, one or more Local Area Networks (LANs), one or more Wide Area Networks (WANs), one or more Ethernets or the Internet, or one or more terrestrial, satellite or wireless links, or a combination thereof. For purposes of illustrating a clear example, network 100 is shown as a single element but in practice, network 100 may comprise one or more local area networks, wide area networks, and/or internetworks. The various elements of FIG. 1 may also have direct (wired or wireless) communications links, depending upon a particular implementation.

For purposes of illustrating a clear example, FIG. 1 illustrates a single client device 150, a single processor 104, and single instances of certain other elements. Other embodiments may implement any number of such elements. For example, the server computer 102 may be deployed as two or more computers, clusters, containers, and/or virtual machine instances in one or more physical or virtual machines that are co-located, separate, and/or located in shared computing facilities such as cloud computing datacenters. As another example, the server computer 102 may communicate with a plurality of client computing devices 150 and/or a plurality of image requesting entity devices 130.

3.0 STORED CLIENT DATA

Figure 1B:
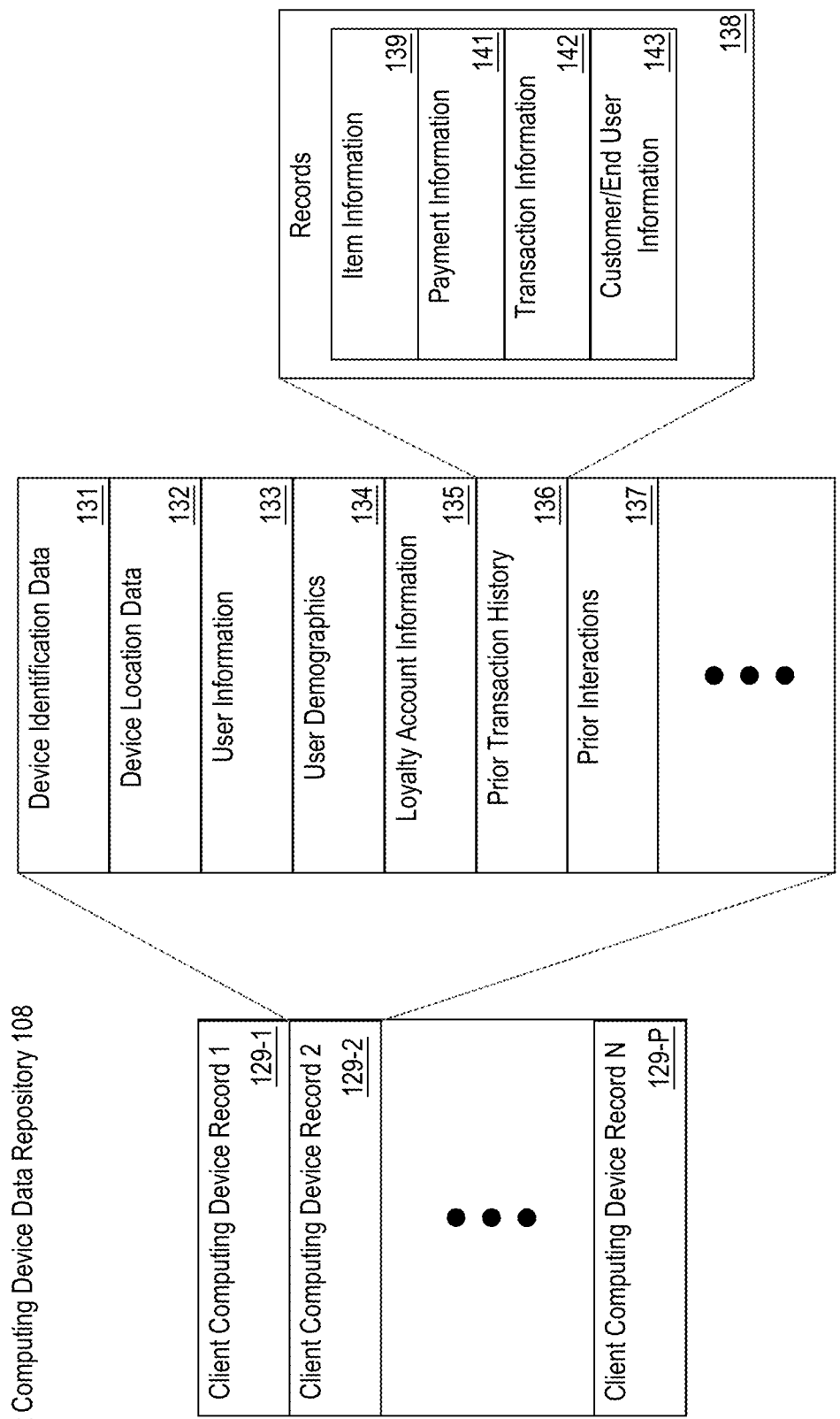
FIG. 1B illustrates a block diagram of an example data structure for the client computing device data repository for storing a plurality of records, each of which corresponds to a particular client computing device.

FIG. 1B illustrates a block diagram of an example data structure for the client computing device data repository 108 for storing a plurality of records 129, each of which corresponds to a particular client computing device. In some implementations, each client computing device record 130 includes: (i) static attributes for the client computing device, such as, device identification data 131, (e.g., a mobile device identifier), operating system type, (ii) dynamic attributes for the client computing device, such as device location data 132 (e.g., GPS co-ordinates), operating system version, (iii) user information 133 associated with a user operator of the client computing device and/or his or her activities using the client computing device, such as user demographics 134, loyalty account information 135 for one or more providers, prior transaction history 136, prior search history 137, and/or prior interactions 138 with various systems, such as use of digital or physical offers through one or more websites. The prior transaction data 136 may include records 138 for past transactions relating to consumer-packaged goods (CPGs) or other items and may be obtained from online or brick-and-mortar merchants, card issuers, or other sources.

A record 138 may include fields or data values for one or more of: (i) item information 139, such as: item identification, item category information, a universal product code, quantity of product purchased, number of items purchased; (ii) payment information 141, such as: a transaction amount, at least a portion of a credit card number that was used, a payment identifier that identifies a form of payment that was used, a secure payment hash key, one or more offers that were redeemed; (iii) transaction information 142, such as: transaction number, an identifier of a data processing system, an identifier of a merchant or retailer facility, a time or date when a transaction took place, RFID data, a device identifier; (iv) customer/end user information 143, such as; customer name, customer identification, phone number, personal identifier number (PIN), password, code, loyalty card number, and so on. Other embodiments may include other fields or values.

Client computing device data repository may store data received from the client computing device 150, the image requesting entity computing device 130, the provider entity computing devices 140, and/or one or more external data sources. For example, the data repository may store data identifying a loyalty program through a particular provider for a particular client computing device. The particular provider may send transaction data to the server computer 102 which identifies past transactions between the provider and a plurality of customers. The server computer 102 may identify transactions between the particular provider and the user of the particular client computing device based on matching loyalty program identifiers between the stored data and the transaction data. In response to identifying the transactions as occurring between the particular provider and the user of the particular client computing device, the server computer 102 may store transaction history data for the particular client computing device which identifies items purchased, offers redeemed, and/or any other data relating to the identified transactions.

3.0 STORED DATA

FIG. 2 is a flow diagram that illustrates an example method for generating a dynamic image.

At step 202, a first plurality of digital content items is stored at a server computer. Digital content items may include media, such as images or video, text inputs, such as flat text files or text strings, and/or hyperlinks to one or more websites. The first plurality of digital content items may include brand logos and/or images associated with physical goods. While brand logos and physical goods images are described as separate images, digital content items may additionally include single images that contain both brand logos and images of physical goods.

The first plurality of digital content items may correspond to an image requesting entity. The image requesting entity comprises an entity which requests the generation and display of an image on the client computing device using one or more elements provided by and/or relating to the image requesting entity. For example, the image requesting entity may comprise a producer of commercial packaged goods (CPGs) that requests banner advertisements to be displayed on a client computing device. As another example, the image requesting entity may comprise a requester for a dynamic image for a website which comprises particular design elements.

The first plurality of digital content items may include different types of items. For example, the producer of CPGs may manage a plurality of brands, each of which comprising a plurality of different goods within the brand. The CPG producer may send images of a brand of cat food with various different types of cat food that are sold under that brand as well as images of a brand of potato chips with various different types of potato chips within the brand. As another example, a website manager may send various images which are associated with different features of the website. For instance, a video game publisher website may include a plurality of different of games. The website manager may send images associated with each of the different games to the server computer.

In an embodiment, the first plurality of digital content items is additionally stored with metadata describing one or more aspects of the digital content items. As an example, an image of a brand logo may be accompanied with data identifying the brand. As another example, physical goods images may be stored with data describing the physical goods, such as size, weight, nutritional facts, whether the ingredients are natural and/or organic, flavor, scent, and/or other item specific information. The server computer 102 may store the data in a data repository with an identifier of the corresponding digital content item.

At step 204, a second plurality of digital content items comprising call to action identifiers is stored at the server computer. A call to action may comprise a message that describes an action to take by a viewer of the digital image. For example, a call to action may invite a viewer of the digital image to select the image in order to be transferred to a website for printing a coupon. The calls to action may include images and/or text. For example, a first call to action identifier may be stored in association with an image corresponding to a particular website. A second call to action identifier may be stored in association with a particular string of text, such as "Save $1 on Laundry Detergent."

In an embodiment, calls to action and/or other messages may include one or more customizable elements. For example, a particular message may include the text "YOU'RE [_] MILES AWAY FROM FRESHNESS" where the "[_]" is a customizable element that can be determined at the time of generation of the digital image. Messages with customizable elements may be identified as containing customizable elements and may be stored with data indicating the type of customizable element, such as distance, discount amount, name, similar product name, etc.

At step 206, a third plurality of digital content items is stored at the server computer. In an embodiment, each of the third plurality of digital content items corresponds to a different provider entity of a plurality of provider entities. Provider entities may comprise providers of physical goods, such as retail and/or grocery stores. The third plurality of digital content items may include images corresponding to the providers of physical goods, such as logos or other identifying images. The server computer may additionally store and/or receive data from the plurality of providers to be associated with the images, third plurality of digital content items, such as store locations, catalogs, prices, discounts, loyalty programs, and store hours.

At step 208, client computing device history data identifying previous actions corresponding to a client computing device is stored at the server computer. Client computing device history data may comprise data relating to the use of the client computing device and/or relating to a user of the client computing device. For example, client computing device history data may include one or more of a location of the client computing device, historical location data for the client computing device, demographics of the user of the client computing device, loyalty account information for the user of the client computing device, prior purchase history, and/or prior interactions with one or more applications, web services, and/or other server computers.

Client computing device history data may be received directly from the client computing device, from one or more external data servers, and/or one or more provider entity computing devices. For example, the client computing device may periodically send location data to one or more external servers. Using the location data throughout a period of time, such as a week, the external server may identify a home location of the client computing device, a work location of the client computing device, repeated destinations of the client computing device, and/or repeated routes used by the client computing device.

Client computing device history data may also be generated by the server computer and/or inferred based on other client computing device history data. For example, based on the historical location data for a client computing device, the server computer may determine that the client computing device visited three commercial establishments at particular times during a day. The server computer may additionally receive transaction data from provider entities at each establishment. Using the transaction data and the historical location data, the server computer may correlate transaction data from each establishment to the client computing device. As another example, the server computer may compute one or more values for the client computing device based on stored client computing device data as described further herein.

At step 210, provider entity data comprising data corresponding to each of the plurality of provider entities is stored at the server computer. Provider entity data may be received from each of the plurality of provider entity computing devices which describe the provider entities. Provider entity data may comprise one or more of store locations, store hours, product availability, product pricing, product promotions, equivalent pricing, demographics of shoppers, or whether the store provides online grocery pickups, same day shipping, and/or one day shipping.

Provider entity data may be received periodically and/or when the provider entity computing devices send updates. For example, a provider entity computing device may send an update to the server computer indicating that a particular location of the provider entity has sold out of a particular product. Additionally or alternatively, the server computer may request data from the provider entity computing device, such as catalogs, availability, and pricing, periodically and/or in response to a request to generate a digital image for a client computing device.

In an embodiment, the server computer additionally receives environment data from one or more external data sources. Environmental data may include time of day, day of week, weather information, seasonal information, flu information, pollen density, location in a web page/application of the image, type of webpage/application in which the image will be displayed, and/or one or more current events, such as sports events or holidays.

4.0 DYNAMIC IMAGE GENERATION

At step 212, a first particular digital content item of the first plurality of digital content items is identified based, at least in part, on a first subset of the client computing device history data. For example, the server computer may identify one or more CPGs to recommend to a client computing device based on the client computing device history data. In an embodiment, the server computer determines a brand of item, a type of item, and a specific item based on client computing device history data. Thus, the server computer may separately identify a plurality of first particular digital content items for the image, each of which relating to a separate category such as brand, product, and/or product type. Example algorithms for selecting from the first digital content items are described further herein.

As a concrete example, the server computer may recommend cat litter to a client computing device based on client computing device history data which shows periodic purchases of cat litter. The server computer may identify a brand of cat litter to recommend based on previous purchases and a specific product based on past purchases and/or product descriptions, such as size, ingredients, and/or other item specific data. For instance, the server computer may select FreshCat brand cat litter based on prior purchases of FreshCat brand cat litter and the jumbo unscented multi-cat version of FreshCat brand cat litter based on previous bulk purchases and identified preferences for unscented.

The first particular digital content item may be determined based, at least in part, on environmental data. For example, the server computer may store a pollen threshold value. If the pollen density for a particular location is greater than the pollen threshold value, the server computer may select a first particular digital content item that corresponds to an antihistamine. As another example, digital content items corresponding to different types of clothing may be selected based on weather, such that items corresponding to warmer clothing are selected during colder weather.

At step 214, a second particular digital content item of the second plurality of digital content items is identified based, at least in part, on a second subset of the client computing device history data. For example, the server computer may identify one or more messages and/or calls to actions based on client computing device history data that indicates the stronger drives of the user of the client computing device. For example, the server computer may determine that a user is most motivated by convenience based on historical shopping data which shows that the user rarely shops at a store that is further away and/or that the client computing device is rarely associated with purchases from more than one location.

In an embodiment, the server computer may separately identify a message to display and a call to action. For example, the call to action may identify the location of a hyperlink, such as a coupon website or application, an online shopping website or application, and/or an organizing website or application such as a digital shopping list. The server computer may additionally include in the image a message to incentivize action, such as a message identifying a deal, proximity of a location, price comparisons between locations, and/or other messages relating to the product. Algorithms for identifying messages and/or call to action identifiers are described further herein.

Messages may additionally be based on environmental or demographic data. For example, during hot weather, a message may include the current temperature and one or more elements related to the temperature, such as the line "beat the heat." As another example, messages relating to a sporting event may be selected based on the location of the client computing device. Thus, for an event between sports teams from San Jose and Las Vegas, the message for client computing devices in San Jose may include a reference to the San Jose team while the message for client computing devices in Las Vegas includes a reference to the Las Vegas team.

At step 216, a third particular digital content item of the third plurality of digital content items is identified based, at least in part, on a third subset of the client computing device history data and the provider entity data. For example, the server computer may identify a provider entity of the plurality of provider entities based on client computing device data and provider entity data. The server computer may select the content item corresponding to the identified provider entity for displaying in the digital image.

As a concrete example, the server computer may identify a first nearby retailer which provides an item at a lowest price and a second nearby retailer which is closest to the client computing device's current location. The server computer may use the client computing device history data to classify the client computing device as either interested in value or convenience. If the server computer classifies the client computing device as interested in value, the server computer may select the first nearby retailer and the corresponding digital content item for the first nearby retailer. If the server computer classifies the client computing device as interested in convenience, the server computer may select the second nearby retailer and the corresponding digital content item for the second nearby retailer.

At step 218, a digital image comprising the first particular digital content item, the second particular digital content item, and the third particular digital content item is generated. For example, the server computer may store data identifying parameters for generating an image, such as locations for different digital content items. The server computer may use the stored parameters to generate a combined image from the different digital content items.

Figure 3:
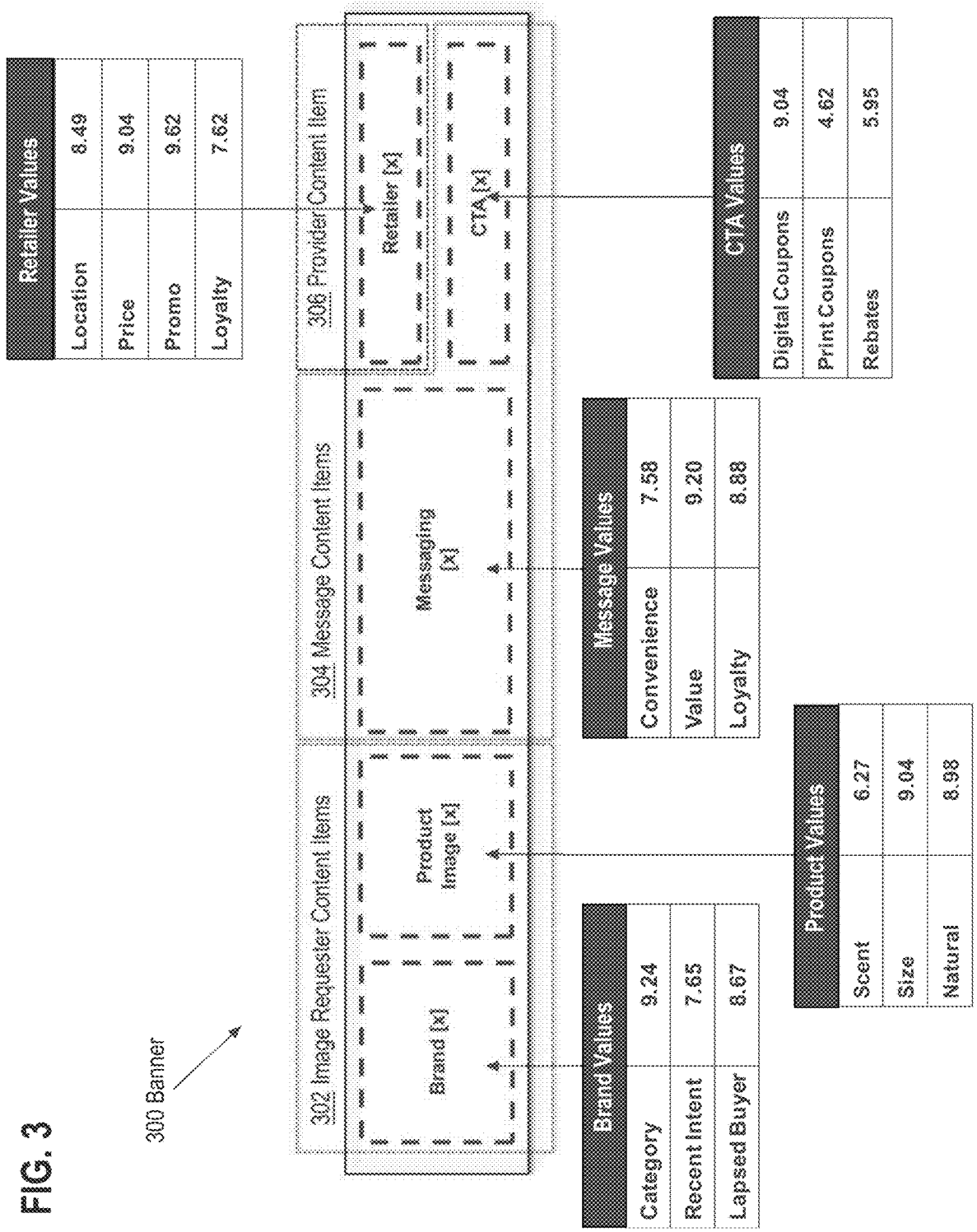
FIG. 3 depicts an example of a customizable banner image which comprises a plurality of locations for displaying different digital content items.

FIG. 3 depicts an example of a customizable banner image which comprises a plurality of locations for displaying different digital content items. FIG. 3 comprises image requester content items 302, message content items 304, and provider content item 306. FIG. 3 is intended to provide a concrete example and in embodiments the number, orientation, and/or sizes of elements may differ. For example, embodiments may include a single image requester content item, a single message content item, and/or a plurality of different provider content items.

Image requester content items 302 include a location for a brand image and a location for a product image. Message content items 304 comprises a location for a message and a location for a call to action image. The provider content item 306 comprises a location for a retailer image. Images and messages may be stored that match the parameters of the location for faster image generation. For example, if the aspect ratio for the brand image in image requester content items 302 is 75×75, then the server computer may store digital content items for the brand image location at a resolution of 75×75 and/or at a higher resolution with a 1:1 ratio. The server computer may additionally store digital content of different sizes and shapes for generating different styles of banner images and/or different sizes of images. For example, a vertical banner image may require different sizes and shapes of images than a horizontal banner image.

Referring again to FIG. 2, at step 220, the digital image is sent to the client computing device with instructions which, when executed by the client computing device, cause the client computing device to display the digital image. For example, the server computer may cause a banner image comprising the digital content items to be displayed on a client computing device, such as through a webpage or application interface. In an embodiment, the server computer generates the image when the client computing device navigates to a webpage or application interface which is programmed or configured to display an image from the server computer. For example, the server computer may comprise an advertisement server which is programmed or configured to provide advertisements to webpages and/or applications. By storing modular portions of the banner which can relate to different products, different incentives, and different retailers, the server computer is able to generate custom banners for different client computing devices in response to a request from the webpage and/or application for a banner advertisement.

5.0 ALGORITHMS AND VALUES

In an embodiment, the server computer identifies digital content items based on categorical values for a client computing device. For example, the server computer may compute values for a plurality of categories based on the client computing device history data. Example values include category values, recent intent values, convenience, values, value, values, loyalty values, and other values defining drivers of interest and/or preference. Based on the different computed values, the server computer may determine a specific category, such as the category with the highest value, for a digital content item. The server computer may then identify the digital content item that matches the identified category and select the identified digital content item.

FIG. 3 includes example client computing device values for a plurality of client computing device categories which can be used by the server computer to identify digital content items. For the brand value, FIG. 3 includes options for Category, Recent Intent, and Lapsed Buyer. The category value may be computed as a function of a preference for items in a specific category. For example, the server computer may increment a category counter for each purchase in a particular category or each purchase that includes an item in a particular category. Thus, for each purchase of a book that is associated with a client computing device, the server computer may increment a value in the "book" category. If the brand images for the image requesting entity comprises a book brand, a shampoo brands, and a cookie brand, then the server computer may select the book brand if the category value for the book category is higher than the category values for the shampoo or cookie categories.

The recent intent value may be computed as a function of recent activity of the client computing device. For example, based on prior search history of the client computing device, the server computer may determine whether a user of the client computing device is interested in a specific product or product type. As with the category value, a recent intent value may be incremented each time a search is performed for an item in a particular category and/or an item in a particular category is viewed. Brands matching the items and/or item types with the highest recent intent value may be selected.

Product values refer to values computed for products based on the client computing device history data. The server may use prior transactions records to identify product preferences. For example, the server computer may compute values for various categories of preference, such as cost, quality, and size. Values may be computed as a function of products purchased within a category divided by products purchased total where the category is an option. For example, the server computer may increment a numerator for each large sized product purchased and increment a denominator for each product purchased where the products have various sizes. Thus, if a large version of a product is unavailable, the server computer may not increment a denominator. using the different values, the server computer may identify a specific product of the identified brand that best matches the client computing device's preferences, such as by selecting the category with the highest product value. Thus, if the cost value is higher than the size value, the server computer may select the cheapest product of the particular brand and/or product type instead of the largest.

Product values may differ depending on the product type. For example, product values for laundry detergent may include scent, size, and natural. Each value may be incremented whenever a purchase associated with an item matching the value is identified. For example, if out of ten purchases of laundry detergent, all ten were of the large size, half of them were made with natural ingredients and none of them contained a scent, the value for size may be ten, the value for natural may be five, and the value for unscented may be ten. Values may additionally comprise percentages of purchases, such that values may range from zero to one or be normalized to values between zero and ten.

Product values may be used in conjunction to identify a product value and/or separately in cases where values are mutually exclusive. For example, a particular brand of laundry detergent may only produce scented detergents in a small size. If the product value for size is higher than the product value for scented detergents, the system may select the large unscented detergent over the small scented detergents. On the other hand, if scented detergents are sold at all sizes, the server computer may select the size of the detergent based on the size value and select the scented or unscented versions based on the scent value.

Retailer values may refer to values computed for identifying retailers based on client computing device history data. The server computer may compute values for convenience, value, and/or loyalty based on previous transactions of the user of the client computing device. For example, the server computer may receive transaction data and/or location data for the client computing device. The server computer may identify locations visited by the client computing device, items purchased by the client computing device, other retailers which carried the same items, costs of the items at different retailers, and/or use or non-use of loyalty programs. The server computer may use the transaction data, location data, and identified information within the transaction data and location data to generate the message values.

Convenience may refer to actions which value convenience over other incentives. For example, the server computer may increment a numerator value each time the server computer determines that a user has gone to a single store for all purchases despite cheaper options for goods at other nearby stores. The server computer may additionally increase the numerator value when the server computer determines that the user shopped at a nearby store for items despite the same items being less expensive at a further store. The server computer may increase a denominator value for the computation for each shopping trip. Thus, the convenience value is computed as a percentage of shopping trips where a preference for convenience was demonstrated according to one or more metrics.

Conversely, a value variable may refer to actions which prize value over other incentives. For example, the server computer may increment a numerator value each time the server computer determines that a user has purchased a cheapest item of a plurality of options, shopped at multiple stores and purchased items at stores where they were cheaper despite the items being available at a single location, and/or traveled to a further location for one or more items which are more economical at the further location but available at a closer location. The server computer may increase a denominator value for the computation for each shopping trip. Thus, the value variable is computed as a percentage of shopping trips where a preference for value was demonstrated according to one or more metrics.

A loyalty value may be computed as a function of a percentage of shopping trips where a loyalty program is used. The server computer may increment the numerator for each shopping trip which uses a loyalty program and increment a denominator for each shopping trip.

Based on the computed scores, the server computer may select a message of a plurality of messages for displaying in the digital image. For instance, a convenience message may indicate the distance to a retailer while a value message may indicate the price and/or savings of purchasing the product.

In an embodiment, the messages include one or more customizable elements. The customizable elements may include a price, a savings, a coupon value, a distance to a store, a name of a retailer, a name of a product, and/or other customization options. For example, a value based message may state "Save [$5.00] on [Fresh's Laundry Detergent] by shopping at [GrocerMart]" where the words in brackets are customizable elements that are identified at the generation of the digital image based on one or more of the selected product, select retailer, selected call to action, and/or client computing device data. For instance, in the above example, the $5.00 may be identified as the difference between the price of the detergent at GrocerMart versus the price of the same detergent at the next cheapest location.

Retailer values may be identified in a similar manner as message values. For example, the retailer values in FIG. 3 include a location value, a price value, and a loyalty value. The price value may be computed similarly to the value variable but with a greater emphasis on the cheapest price for a specific product across locations as opposed to a most economical price for a product type when multiple products of the product type are available. For example, the value variable may increment a numerator every time an economical option it chosen over other options, such as choosing the least expensive toothpaste option at a grocery store, while the price value numerator may be incremented each time a retailer with a lower price for a product is selected.

Location values may similarly be identified in a similar manner as convenience values, but with a stronger focus on selections of retailers that are closer than on selecting one retailer instead of a plurality of retailers. While the location and price values are described as being computed in different ways than the value and loyalty values, embodiments may include using the same value computation for both message values and retailer values.

The server computer may select a retailer based, at least in part, on the retailer values for the client computing device and on received retailer data. For example, the server computer may initially determine a location for the client computing device. The location may be the actual location of the device and/or one or more locations associated with the device, such as a home location. The server computer may then identify retailers within a particular distance of the location that are capable of performing a transaction for the selected product. From the identified retailers, the server computer may identify a particular retailer based on the retailer values for the client computing device and retailer data received from the retailer.

For example, if the selected product is Fresh's Laundry Detergent, the server computer may determine which locations within a twenty-five-mile radius of the client computing device location carry Fresh's Laundry Detergent. The server computer may then identify a retailer which matches the client computing device's highest retailer value. For example, if the client computing device's highest retailer value is location, then the server computing device may select the closest retailer to the client computing device location. If the client computing device's highest retailer value is price, then the server computer may compare catalogs of the identified retailers to determine which retailer has the lowest price.

By using the retailer data in conjunction with the client computing device history data, the server computer is able to identify preferences of the client computing device and generate a display that matches those preferences. For instance, while the product and brand may be based on general preferences, the retailers may be selected based on their ability to provide the product, their current proximity to a client computing device, and/or their current prices. Thus, while the computation for the client computing device for brand or product may produce the same result regardless of client computing device location or retailer ability, the selection of the retailer may be based on real-time data that indicates the level to which the retailer currently meets the preferences of the client computing device.

Call to action values may refer to values computed for the purpose of determining a call to action for the digital image. A call to action may include execution of an application and/or navigation to a website through a hyperlink. For example, a first call to action may include a hyperlink to a coupon website while a second application includes a hyperlink to an online grocery store. Calls to action may be identified based on use of one or more systems in conjunction with purchases. For example, the digital coupons value may identify a percentage of purchases where digital coupons were used while the print coupons value may identify a percentage of purchases where print coupons were used. If the digital coupons value is highest, the call to action may include a hyperlink to a website with digital coupons. If the print coupons value is highest, the call to action may include a hyperlink to a website where a physical coupon may be printed. The call to action may additionally include images based on the selected type of call to action. For example, if the call to action is a link to a website describing the product, the call to action image may be a box with the words "Learn More."

Using the mix of client computing device history data and retailer data described herein, the system generates images that comprise various components. While the image may be requested by a requesting entity, such as for the purpose of advertisement, elements of the image may comprise data from various other entities, such as coupon providers or physical content providers. By providing a single image that includes these various elements, the system generates a customized image for the client computing device that identifies not just the item and brand, but a practical means of obtaining the item that is based on actual capabilities of the item providers and preferences of the client computing device. Thus, if a first user shops exclusively at GrocerMart, the server computer may show options for obtaining items identified in the digital image from nearby GrocerMarts. Alternatively, if a second user shops primarily where an item is least expensive, the server computer may show options for obtaining items identified in the digital image from retailers with the lowest prices.

6.0 ADDITIONAL EMBODIMENTS

In an embodiment, the server computer utilizes demographic data of a client computing device to determine one or more values for which client computing history data is too sparse or insufficient to compute. For example, the server computer may not have previous transaction history for a client computing device, but may still have client computing device data, such as demographic information. Demographic information may include age, location, gender, visited websites, interests, and other available information regarding the user of the client computing device. The server computer may train a machine learning system, such as a neural network, using as inputs the demographic data and using as outputs the computed scores for each category. The server computer may then compute a specific output for the client computing device lacking the transaction data using the demographic information as the inputs.

In an embodiment, the server computer utilizes overrides for provider content items. For example, the server computer may receive a request to override the selection of a first provider content item with a second provider content item, such as a competing retailer. The request may be for a specific digital image and/or a plurality of digital images matching one or more criteria. For example, the request may be for overriding selections where the location score is higher than an indicated threshold value and the provider is within a mile of the closest provider to the client computing device. Thus, if the requesting provider is the closest provider and the client computing device has a high location score but a slightly higher price score, the requested override may replace the initially selected provider with the requesting provider.

In an embodiment, digital images are generated in response to a request for the digital image, such as from a visited website. Thus, while client computing device scores may be precomputed, the identification of the digital content items may be performed when the client computing device accesses a website with a place for a digital image to be provided by the server computer. For example, the server computer may precompute the brand values, product vales, message values, retailer values, and CTA values in advance. When the client computing device attempts to access the web site, the server computer may select a brand, product, message, retailer, CTA, and any customizable elements for the message. Thus, the server computer is able to use the precomputed values and information regarding the client computing device and/or retailers to dynamically generate the digital image.

As an example, the server computer may store retailer values for a particular client computing device with a high location value and low price and loyalty values. When the server computer determines that a digital image needs to be generated, the server computer may identify the brand and product for the digital image. The server computer may then identify the current location of the client computing device and the closest provider to the client computing device. The server computer may identify a call to action for the product and a message for displaying in the image along with any customizable elements for the messages based on digital offers, product information, retailer information, and/or client computing device location data. The server computer may then display the digital image to the client computing device.

By generating the digital image in response to the request, the server computer is able to select content items based on current needs of the client computing device. Thus, retailers selected based on distance may remain relevant when a client computing device is in a unique location as the retailers may be selected based on their proximity to the client computing device. Additionally, retailers and CTAs may be selected based on the most recent offer data, thereby limiting situations where a product is no longer available or no longer available at the indicated price.

Customization of the digital image may additionally be based on the display of the digital image. For example, banner 300 in FIG. 3 may comprise the size, shape, and layout of a banner for a first website while a different sized banner is used for the second website. As the images for different content items are accessible by the server computer, the server computer may generate digital images of different sizes and shapes by placing images in different locations and/or by using alternative versions of the image. By dynamically generating the digital image, the server computer is able to optimize the image for different websites and/or screen sizes. Additionally, the server computer may use different numbers of elements for different situations. For example, if a smaller banner does nor have room for a message, the server computer may generated a banner with four digital content items instead of five.

7.0 BENEFITS OF CERTAIN EMBODIMENTS

Using the systems and methods described herein, a server computer is able to dynamically generate images based on content items from various sources. Thus, while maintaining the design elements from the image requester, the server computer is also able to display design elements from various other digital content sources. For instance, a banner describing an item may be generated which also includes image data corresponding to a location where the item may be obtained and image data corresponding to an action that may be performed by the client computing device, such as navigating to a website through a hyperlink embedded in the digital image.

Additionally, by storing the digital content elements for each category and computing the client computing device values in advance, the system is able to generate digital images on the fly that are customized to individual client computing devices based on current data. For instance, a portion of the digital image may identify content providers based on the client computing device's current location and/or recent catalogs of the content providers. By generating the images at the time of the image request, the server computer is additionally able to save on storage, as the customized digital images are generated for a particular use and then discarded. Images that are pre-generated would have to be stored on the client computing device until some of the data changes, thereby requiring a new image to be generated.

Thus, the methods provided herein allow a computing device to dynamically generate images using content from different locations, based on data specific to a client computing device, while saving on processing power by pre-computing the client computing device values and saving on storage by generating, using, and discarding images on the fly.

8.0 HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
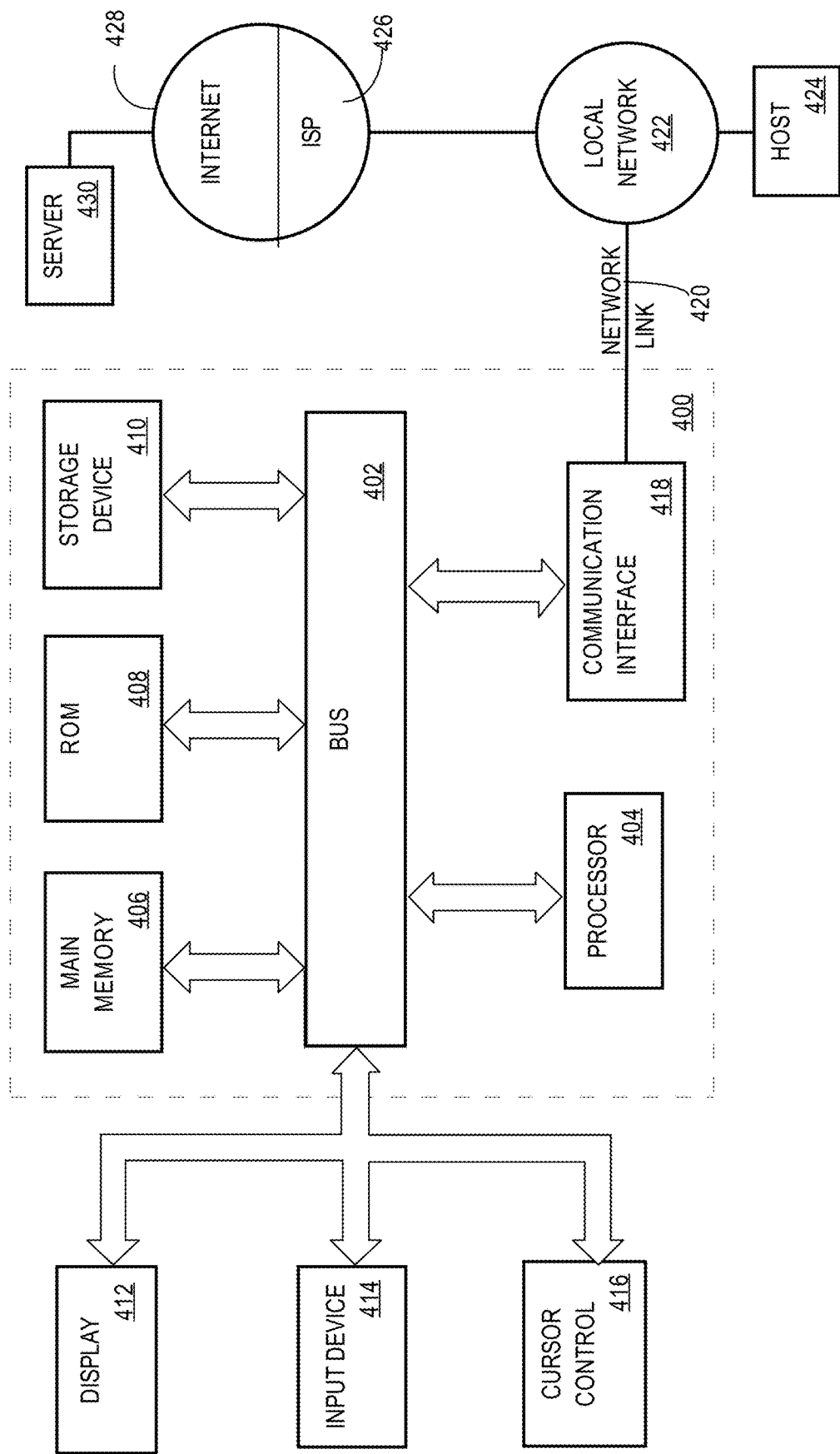
FIG. 4 illustrates an example computer system with which embodiments may be implemented.

For example, FIG. 4 is a block diagram that illustrates a computer system 400 upon which an embodiment of the disclosure may be implemented. Computer system 400 includes a bus 402 or other communication mechanism for communicating information, and a hardware processor 404 coupled with bus 402 for processing information. Hardware processor 404 may be, for example, a general-purpose microprocessor.

Computer system 400 also includes a main memory 406, such as a random-access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world-wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A computer-implemented method comprising:
   storing, at a server computer, a first plurality of digital content items, the first plurality of digital content items of an image requesting entity;
   storing, at the server computer, a second plurality of digital content items comprising call to action identifiers;
   storing, at the server computer, a third plurality of digital content items, each of the third plurality of digital content items of a different provider entity of a plurality of provider entities;
   storing, at the server computer, client computing device history data identifying previous actions of a client computing device;
   storing, at the server computer, provider entity data comprising data of each of the plurality of provider entities;
   identifying a first particular digital content item of the first plurality of digital content items by:
      using a first subset of the client computing device history data, computing a first plurality of client computing device values, each of the first plurality of client computing device values comprising a value of a plurality of client computing device category of a plurality of client computing device categories;
      identifying a first client computing device category with the highest value of the first plurality of client computing device values; and
      determining that the first particular digital content item corresponds to the first client computing device category;
   identifying a second particular digital content item of the second plurality of digital content items by:
      using a second subset of the client computing device history data, computing a second plurality of client computing device values, each of the second plurality of client computing device values comprising a value of the plurality of client computing device category of a plurality of client computing device categories;
      identifying a second client computing device category with the highest value of the second plurality of client computing device values; and
      determining that the second particular digital content item corresponds to the second client computing device category;
   identifying a third particular digital content item of the third plurality of digital content items based, at least in part, on a third subset of the client computing device history data and the provider entity data;
   generating a digital image comprising the first particular digital content item, the second particular digital content item, and the third particular digital content item; and
   sending the digital image to the client computing device with instructions directing the client computing device to display the digital image.

2. The computer-implemented method of claim 1, further comprising:
   using the third subset of the client computing device history data, computing a third plurality of client computing device values, each of the third plurality of client computing device values of a different client computing device category of the plurality of different client computing device categories;
   based on the third plurality of client computing device values, selecting a third client computing device category of the plurality of different client computing device categories;
   determining that the third particular digital content item corresponds to the third client computing device category and, based in part on the determining, performing the identifying of the third particular digital content item.

3. The method of claim 1:
wherein the second particular digital content item comprises one or more customizable elements;
wherein generating the image comprises customizing the one or more customizable elements based, at least in part, on the client computing device history or current client computing device data received from the client computing device.

4. The method of claim 1, further comprising:
receiving a request to supply a second digital computer with a digital image;
performing the identifying the first particular digital content item, the second particular digital content item, and the third particular digital content item in response to receiving the request.

5. The method of claim 1:
wherein the first plurality of digital content items corresponds to physical goods produced by the image requesting entity;
wherein the provider entities comprise retailers that sell one or more of the physical goods produced by the image requesting entity;
wherein identifying the first particular digital content item comprises identifying a particular physical good to advertise on the client computing device;
wherein identifying the third particular digital content item comprises identifying a particular retailer that is capable of providing the particular physical good.

6. The method of claim 1,
wherein the second plurality of digital content items correspond each correspond to one or more hyperlinks;
wherein identifying the second particular digital content item comprises identifying a particular hyperlink for the digital image;
wherein causing displaying the digital image comprises attaching the particular hyperlink to the digital image such that a selection of the image corresponds to a selection of the particular hyperlink.

7. The method of claim 1, wherein identifying the third particular digital content item comprises:
identifying one or more user preferences from the client computing device history data;
identifying an initial digital content item of the third plurality of digital content items based, at least in part, on the one or more user preferences;
receiving a request from a particular provider entity of the plurality of provider entities to override identification of digital content items for users that meet one or more criteria;
determining, based on the third subset of the client computing device history data, that the client computing device meets the one or more criteria and, in response, identifying the third particular digital content item for the digital image.

8. The method of claim 7, further comprising:
using the third subset of the client computing device history data, computing a plurality of client computing device values, each of the plurality of client computing device values of a different client computing device category of a plurality of different client computing device categories;
wherein the one or more criteria comprises a threshold value for a particular client computing device category;
wherein determining that the client computing device meets the one or more criteria comprises determining that a client computing device value for the particular client computing device category is greater than the threshold value.

9. A system comprising:
one or more processors;
a memory communicatively coupled to the one or more processors storing instructions which, when executed by the one or more processors, cause performance of:
storing, in the memory, a first plurality of digital content items, the first plurality of digital content items of an image requesting entity;
storing, in the memory, a second plurality of digital content items comprising call to action identifiers;
storing, in the memory, a third plurality of digital content items, each of the third plurality of digital content items of a different provider entity of a plurality of provider entities;
storing, in the memory, client computing device history data identifying previous actions of a client computing device;
storing, in the memory, provider entity data comprising data of each of the plurality of provider entities;
identifying a first particular digital content item of the first plurality of digital content items by: using a first subset of the client computing device history data, computing a first plurality of client computing device values, each of the first plurality of client computing device values comprising a value of a plurality of client computing device category of a plurality of client computing device categories; identifying a first client computing device category with the highest value of the first plurality of client computing device values; and determining that the first particular digital content item corresponds to the first client computing device category;
identifying a second particular digital content item of the second plurality of digital content items by:
using a second subset of the client computing device history data, computing a second plurality of client computing device values, each of the second plurality of client computing device values comprising a value of the plurality of client computing device category of a plurality of client computing device categories;
identifying a second client computing device category with the highest value of the second plurality of client computing device values; and
determining that the second particular digital content item corresponds to the second client computing device category;
identifying a third particular digital content item of the third plurality digital of content items based, at least in part, on a third subset of the client computing device history data and the provider entity data;
generating a digital image comprising the first particular digital content item, the second particular digital content item, and the third particular digital content item; and
sending the digital image to the client computing device with instructions directing the client computing device to display the digital image.

10. The system of claim 9, wherein the instructions, when executed by the one or more processors, further cause performance of:
using the third subset of the client computing device history data, computing a third plurality of client computing device values, each of the third plurality of client computing device values of a different client computing device category of the plurality of different client computing device categories;

based on the third plurality of client computing device values, selecting a third client computing device category of the plurality of different client computing device categories;

determining that the third particular digital content item corresponds to the third client computing device category and, based in part on the determining, performing the identifying of the third particular digital content item.

11. The system of claim 9:

wherein the second particular digital content item comprises one or more customizable elements;

wherein generating the image comprises customizing the one or more customizable elements based, at least in part, on the client computing device history or current client computing device data received from the client computing device.

12. The system of claim 9, wherein the instructions, when executed by the one or more processors, further cause performance of:

receiving a request to supply a second digital computer with a digital image;

performing the identifying the first particular digital content item, the second particular digital content item, and the third particular digital content item in response to receiving the request.

13. The system of claim 9:

wherein the first plurality of digital content items corresponds to physical goods produced by the image requesting entity;

wherein the provider entities comprise retailers that sell one or more of the physical goods produced by the image requesting entity;

wherein identifying the first particular digital content item comprises identifying a particular physical good to advertise on the client computing device;

wherein identifying the third particular digital content item comprises identifying a particular retailer that is capable of providing the particular physical good.

14. The system of claim 9:

wherein the second plurality of digital content items correspond each correspond to one or more hyperlinks;

wherein identifying the second particular digital content item comprises identifying a particular hyperlink for the digital image;

wherein causing displaying the digital image comprises attaching the particular hyperlink to the digital image such that a selection of the image corresponds to a selection of the particular hyperlink.

15. The system of claim 9, wherein identifying the third particular digital content item comprises:

identifying one or more user preferences from the client computing device history data;

identifying an initial digital content item of the third plurality of digital content items based, at least in part, on the one or more user preferences;

receiving a request from a particular provider entity of the plurality of provider entities to override identification of digital content items for users that meet one or more criteria;

determining, based on the third subset of the client computing device history data, that the client computing device meets the one or more criteria and, in response, identifying the third particular digital content item for the digital image.

16. The system of claim 15, wherein the instructions, when executed by the one or more processors, further cause performance of:

using the third subset of the client computing device history data, computing a plurality of client computing device values, each of the plurality of client computing device values of a different client computing device category of a plurality of different client computing device categories;

wherein the one or more criteria comprises a threshold value for a particular client computing device category;

wherein determining that the client computing device meets the one or more criteria comprises determining that a client computing device value for the particular client computing device category is greater than the threshold value.

* * * * *